United States Patent [19]

Jürgen et al.

[11] Patent Number: 5,310,515

[45] Date of Patent: May 10, 1994

[54] PROCESS TO COOL AND PELLETIZE MOLTEN STRANDS ISSUING FROM NOZZLES

[75] Inventors: Keilert Jürgen, Kleinwallstadt; Glöckner Frank, Aschaffenburg, both of Fed. Rep. of Germany

[73] Assignee: Reiter Automatik Apparate-Maschinebau GmbH, Fed. Rep. of Germany

[21] Appl. No.: 957,365

[22] Filed: Oct. 7, 1992

[30] Foreign Application Priority Data

Oct. 8, 1991 [DE] Fed. Rep. of Germany ....... 4133329

[51] Int. Cl.⁵ .................. B29B 9/06; B29C 47/88
[52] U.S. Cl. .................. 264/143; 264/177.19; 264/211.14; 264/235.6; 264/237; 264/348
[58] Field of Search ............ 264/143, 131, 211.13, 264/211.14, 211.15, 211.17, 211.18, 174, 177.17, 177.19, 178 R, 235.6, 237, 348, 346

[56] References Cited

U.S. PATENT DOCUMENTS

| | | | |
|---|---|---|---|
| 2,318,679 | 5/1943 | Dreyfus | 264/211.17 |
| 2,436,201 | 2/1948 | Cole | 264/211.14 |
| 2,464,746 | 3/1949 | Gering | 264/177.17 |
| 2,829,027 | 4/1958 | Raynolds et al. | 264/177.19 |
| 3,046,606 | 7/1962 | Carter | 264/177.17 |
| 3,250,834 | 5/1966 | Collins | 264/143 |
| 3,259,681 | 7/1966 | Bull et al. | 264/177.19 |
| 3,264,389 | 8/1966 | Sims | 264/131 |
| 3,520,766 | 7/1970 | Newman | 264/131 |
| 3,686,386 | 8/1972 | Arau et al. | 264/211.14 |
| 3,862,287 | 1/1975 | Davis | 264/131 |
| 3,999,910 | 12/1976 | Pendlebury et al. | 264/211.14 |
| 4,003,773 | 1/1977 | Grable | 264/143 |
| 4,035,879 | 7/1977 | Schippers | 264/235.6 |
| 4,362,682 | 12/1982 | Berg et al. | 264/143 |
| 4,627,804 | 12/1986 | Kobayashi et al. | 264/178 R |
| 4,812,112 | 3/1989 | Balk | 264/211.14 |
| 4,963,388 | 10/1990 | Benoit | 264/131 |
| 5,000,891 | 3/1991 | Green | 264/143 |
| 5,019,316 | 5/1991 | Ueda et al. | 264/211.15 |
| 5,108,673 | 4/1992 | Wegmann | 264/143 |

FOREIGN PATENT DOCUMENTS 2161067 3/1973 Fed. Rep. of Germany.
3623157 12/1986 Fed. Rep. of Germany.

*Primary Examiner*—Jay H. Woo
*Assistant Examiner*—Duane S. Smith
*Attorney, Agent, or Firm*—Banner, Birch, McKie & Beckett

[57] ABSTRACT

Process to cool and pelletize molten strands, which issue from nozzles and are first stretched in the region following the nozzles and then are cooled for the pelletizing operation. The strands are gently cooled up to a kneadable state while stretching and compacting along a tempering region, which is designed as a fluidized bed driven with gas, in particular air, and subsequently conveyed into an intensive cooling region, where the strands are chilled with cooling water and are substantially hardened, while feeding so as to cause stretching, for the subsequently pelletizing operation.

5 Claims, 1 Drawing Sheet

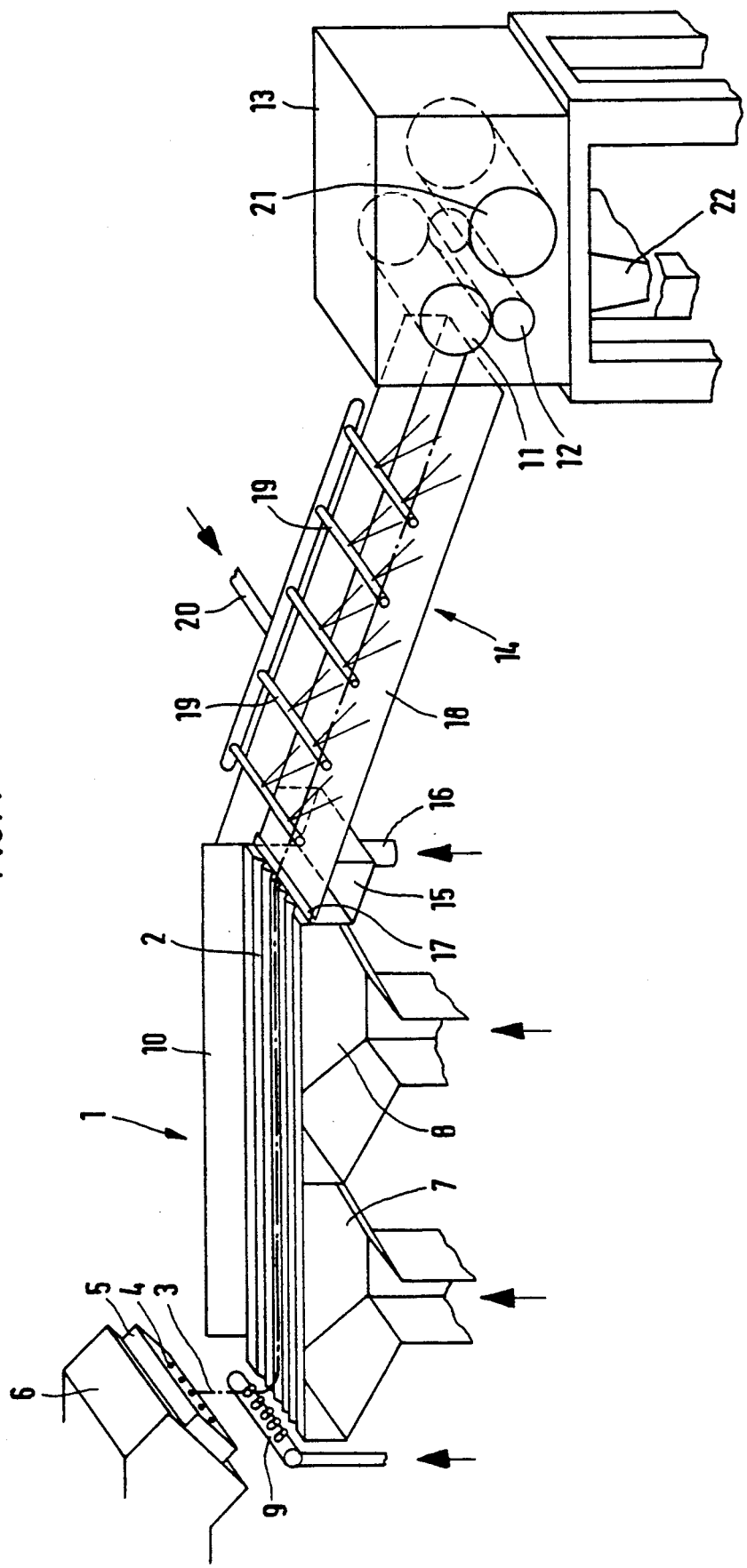

PROCESS TO COOL AND PELLETIZE MOLTEN STRANDS ISSUING FROM NOZZLES

BACKGROUND AND SUMMARY OF THE INVENTION

The invention relates to a process to cool and pelletize molten strands, which issue from nozzles and are first stretched in the region following the nozzles and then are cooled for the pelletizing operation.

Devices to cool and pelletize thermoplastic strands are known in various embodiments. Thus, the DE-PS 25 03 455 shows a device with a discharge channel, over which a current of cooling water is guided into which the strands issuing from the nozzles flow. Furthermore, a device is known from the DE-OS 2 230 187, wherein the strands are guided by means of two opposing, adjacent revolving belts in which the strands and the cooling water are introduced. These devices are based on the principle of rapidly subjecting the strands, guided through a short stretch of air in which they virtually do not cool themselves, to the chilling effect of the cooling water and transporting the strands, enveloped by cooling water to the feed rollers of a pelletizer. In so doing, the strands arrive in a state in the pelletizer in which at least their surface is solidified. The devices can also be designed or operated in such a manner that a continuous solidification of the strands upon entry into the pelletizer is achieved.

Furthermore, it is known from the DE-PS 39 00 250 to divide a discharge channel of a device to cool and pelletize strands that is fed with cooling water into several zones, and in particular in such a manner that first, as in the case of the device according to the DE-PS 25 03 455, a discharge channel fed with cooling water is provided that is following by a dewatering region, in which the water flowing from the discharge channel is largely drawn off. The dewatering region is followed by a drying region, in which a current of gas is led on the strands and by means of which the residual water still adhering to the strands is almost completely removed. These three zones are in succession in the frame of the discharge channel, which brings about a distinct cooling effect only in its first region, guiding the cooling liquid.

It is also known from the DE-AS 21 61 067 to first stretch plastic strands after they have issued in the molten state from the nozzles, whereby for the purpose of preventing the strands from adhering their surface is cooled first by a flood of cooling water immediately behind the nozzles. Thereafter the strands are guided unimpeded through the air to a feed roller, which causes the strands to be stretched. Then the strands are cooled for the subsequent pelletizing. Preventing the strands from adhering with the flood of cooling water and then freely guiding the strands through the air leads to a purely superficial hardening of the strands, so that the result is a highly nonuniform degree of hardening over the cross section of the strands, a feature that is undesired for stretching.

Furthermore, it is known from the DE-OS 36 23 157 to convey molten strands issuing from the nozzles by a conveyor belt without cooling, wherein the strands are supposed to adhere to the conveyor belt, so that the conveyor belt can exert a pulling action on the strands.

The invention is based on the problem of providing a process to cool and pelletize molten strands issuing from nozzles, with which plastics can be processed that exhibit a relatively high thermal conductivity and include in particular plastics reinforced with fibers. Fiber reinforced plastics are extruded like unreinforced plastics in the molten state out of nozzles and subsequently pelletized.

The problem is solved according to the invention in that the strands are gently cooled up to a kneadable state while stretching and compacting along a tempering region, which is designed as a fluidized bed driven with gas, in particular air, and subsequently conveyed into an intensive cooling region, where the strands are chilled with cooling water and are substantially hardened, while feeding so as to cause stretching, for the subsequently pelletizing.

A fundamentally different method than the previously customary cooling process is proposed with the invention, namely while avoiding an immediate rapid cooling, a first subsequent gentle cooling, which causes the plastic to contact radially in the sense of compacting while stretching, so that the plastic material is conveyed in a state in which it hardly deforms any more when being subsequently chilled in the intensive cooling region. In so doing, a gas driven fluidized bed is used in the tempering region; on the one hand, said bed prevents the plastic strands from adhering by causing them to be conveyed without impediment and, on the other hand, it induces a gentle cooling.

The intensive cooling region is designed advantageously as a strand guide filled with cooling water, for which in particular the aforementioned discharge channel and the strand guide with two revolving belts are suitable.

BRIEF DESCRIPTION OF THE DRAWING

The figure shows embodiments of the invention.

FIG. 1 shows a device with a fluidized bed as the tempering region and a discharge channel as the intensive cooling region.

DETAILED DESCRIPTION OF THE PREFERRED EMBODIMENT

The device shown in the figure contains a fluidized bed 1, which is formed by adjacent grooves 2, which are provided to guide strands individually. One of these strands is drawn in FIG. 1 and provided with the reference numeral 3. Other strands are dispensed with for the sake of straightforwardness. The strands 3 issue from nozzles 4, which are arranged in a nozzle plate 5 of a nozzle head 6. The arrangement of the nozzle head with its nozzles is a known design. The fluidized bed 1 is made in the region of its grooves 2 of a screen material, in which the grooves 2 are stamped. The arrangement of the nozzles 4 and the grooves 2 is designed in such a manner that the strands 3 fall from each nozzle 4 into an individual groove 2 and are led away by said groove. Underneath the grooves 2 are the two gas feed chutes 7 and 8, which guide a gas stream, which extends in the longitudinal direction of the drawn arrow and which is delivered by a blower (not illustrated). The gas delivered by the gas feed chutes 7 and 8 escapes through the screen material of the grooves 2 and lifts thus the strands led by the grooves 2 in the sense of the effect of a fluidized bed. To give the strands 3 already prior to their transfer into the region of the grooves 2 a transport component along the fluidized bed 1, the gas nozzles 9 are provided, and in particular one gas nozzle per groove 2. The gas nozzles 9 blow a as stream into the individual grooves 2 and provide that the strands 3 flowing towards the screen material of the grooves 2 are rerouted without touching the screen material and are borne and guided along the grooves 2.

The longitudinal sides of the fluidized bed 1 also have a wall, of which one wall 10 is shown. The opposite wall is omitted for reasons of a better overview of the drawing.

The fluidized bed 1 is the aforementioned tempering region. To obtain the effect of gentle cooling with the tempering region, the gas streams supplied over the air feed chutes 7 and 8 and the nozzles 9 are heated to such an extent with respect to the surrounding air that, e.g., for processing glass fiber reinforced PA6.6 having a melting temperature of about 270°, their temperature, reduced by about 100° with respect to said PA6.6, is at about 170°. The result along the fluidized bed 1 is a stretching of the plastic strands 3 subject to the effect of the feed rollers 11 and 12 of the pelletizer 13, to be explained later, and simultaneously a compacting of the plastic strands 3, which assume a kneadable state finally at the end of the fluidized bed 1 and thus the tempering region, whereby they are gently cooled along the tempering region subject to the effect of the gas stream supplied in the fluidized bed 1. The temperature of the gas is set so that no cavities, in particular vacuoles, are produced during compacting. Further, the length of the fluidized bed 1 is selected in such a manner that on its end the temperature of the strands 3 are in the range of their Vicat softening point.

The gas fed to the fluidized bed 1 is heated by the known method with electric heaters, which can be controlled in a suitable manner.

The fluidized bed 1 as tempering region is followed by the strand guide 14, which acts here as the intensive cooling region by feeding with cooling water. As the strand guide 14, such a guide in accordance with the aforementioned DE-PS 25 03 455 is used.

The strand guide 14 has on its side facing the fluidized bed 1 the water tank 15, to which cooling water is supplied by way of the pipe 16 in the direction of the drawn arrow. The cooling water flows from the slotted nozzle 17 uniformly on the bottom 18 of the strand guide 14 and forms on it an adequately high film of cooling water in order to intensively cool the strands 3 in the region of the strand guide 14. Above the bottom 18 are extrusion nozzles 19, to which cooling water, which is sprayed on the strands 3, guided along the bottom 18, is supplied by way of the feeder 20, so that the strands 3 are subjected to intensive cooling. Owing to this intensive cooling the strands are cooled to such an extent up to reaching the feed rollers 11 and 12 that they are available in a substantially hardened state for feeding into the pelletizer 13. Pelletizing in the pelletizer 13 takes place by a known method with the rotor 2, which is shown in principle. The pellets cut by the rotor 21 fall through the take-off chute 22 either into a container or on a conveyor belt (not illustrated).

We claim:

1. Process to cool and pelletize molten strands (3) which issue from nozzles, (4) wherein the strands are first stretched in the region following the nozzles, then are intensively cooled, fed by feed rollers and pelletized in a pelletizer, wherein the strands (3) are gently cooled up to a kneadable state while being stretched by the feed rollers and compacted along said region following the nozzles, wherein said region is a tempering region which is designed as a generally horizontal fluidized bed (1) driven with gas, and wherein the strands are subsequently conveyed into an intensive cooling region, where the strands (3) are chilled with cooling water and are substantially hardened for the subsequent pelletizing operation.

2. Process, as claimed in claim 1, wherein the temperature of the gas is set so that no cavities are produced during compacting.

3. Process, as claimed in claims 1 or 2, wherein the length of the fluidized bed is selected in such a manner that on an end of said fluidized bed the temperature of the strands are in the Vicat softening point range.

4. Process, as claimed in claim 1, wherein the gas utilized in the fluidized bed of the tempering region is air.

5. Process for cooling and pelletizing molten strands issuing from nozzles comprising:
feeding molten strands along a generally horizontal fluidized bed upon issuance of the strands from nozzles, the fluidized bed being driven with gas such that the strands are moved across the bed without significant mechanical contact, said gas having a moderate temperature to gently cool the strands up to a kneadable state;
stretching said strands as they move across said fluidized bed;
intensively cooling said strands after said fluidized bed such that the strands are substantially hardened;
engaging said strands after being substantially hardened with a plurality of feed rollers, said feed rollers pulling said strands to cause said stretching of said strands as they move across said fluidized bed; and
pelletizing said hardened strands after passing by said feed rollers.

* * * * *

UNITED STATES PATENT AND TRADEMARK OFFICE
CERTIFICATE OF CORRECTION

PATENT NO. : 5,310,515
DATED : May 10, 1994
INVENTOR(S) : Keilert Jurgen et al.

It is certified that error appears in the above-identified patent and that said Letters Patent is hereby corrected as shown below:

On the title page, item [73], change "Reiter" to --Rieter--.

Signed and Sealed this

Twenty-seventh Day of December, 1994

Attest:

BRUCE LEHMAN

*Attesting Officer*    *Commissioner of Patents and Trademarks*